March 26, 1963
A. O. SÖDERHOLM
3,082,621
EXTENSOMETER
Filed June 22, 1959
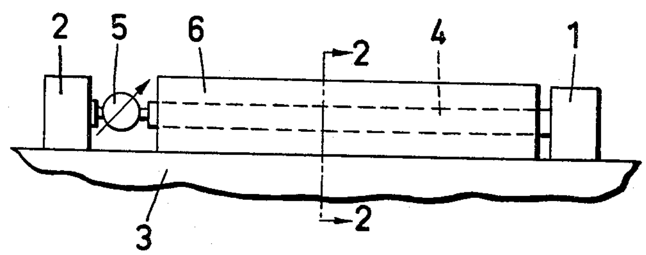
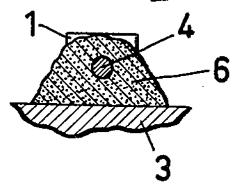
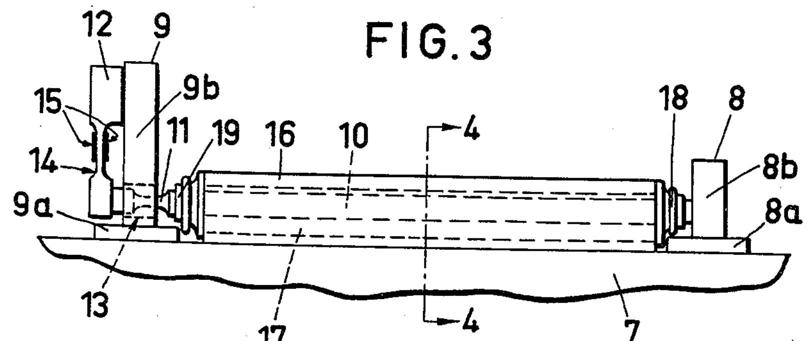
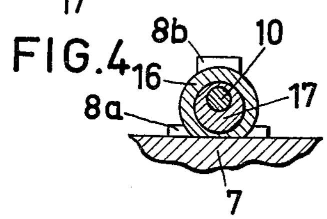
Inventor
Arne Olof Söderholm
by Pierce, Scheffler & Parker
att'ys United States Patent Office 3,082,621

Patented Mar. 26, 1963

3,082,621

EXTENSOMETER

Arne Olof Söderholm, Furusangsvagen 7, Bromma, Sweden

Filed June 22, 1959, Ser. No. 821,904
5 Claims. (Cl. 73—88)

The present invention relates to measuring devices which are used for measuring the deformation of solid materials when loaded. In such devices the displacement of two or several points on the surface of the body in relation to one another is measured. This displacement represents the average value of the extension or compression of the material between the points.

This type of deformation measurement is classical within the material strength technique, and a great many different extensometer constructions with different indicating devices are being used. These extensometers include a reference point (or a pair of spaced reference points placed adjacent one another), said point (or points) being fixed to a frame or a body designed in some other suitable manner, as well as an additional point movable in relation to the fixed reference point (or reference point pair) and the extensometer body. The points are situated in the same transverse plane with the movable point being movable transversely to its longitudinal axis so that it can be moved towards or away from the fixed reference point or the connection line of the two fixed reference points. The extensometer is, by means of some mechanical device or by its own weight, pressed against the body the deformations of which are to be measured, so that the transverse planes of the points coincide with the surface of the body. The movable point will then follow the deformations of the body in relation to the fixed reference point or point reference pair. The movements of the movable point in relation to the extensometer body are measured either with help of a mechanical or optical transmission device which is so designed that the movement thereby magnified can be easily observed. Alternatively, the measurement is carried out with a device which transforms the movement into a measurable electric quantity. In the latter case there is used one or several wire coils, for example, the inductances of which are changed due to the fact that the movable point controls an air gap in their magnetic circuit, and which inductance changes may be made proportional to the movement.

For strength tests the measurements are generally made during a rather short period of time. In order that the measurements shall accurately correspond to the extension of the material, it is necessary that material deformations due to temperature changes shall not become appreciable since they are superposed upon the extensometer indication. In order that the temperature shall not have any influence, the extensometer must follow the temperature of the body and have the same temperature coefficient as the body, which will be explained in detail below. At measurement during longer periods of time the temperature must otherwise be kept constant or corrections must be made. At measurement of small deformations caused by small extensions or compressions during longer periods of time, the temperature changes impair very much the accuracy of the measurement when using the known constructions of the extensometer.

The object of the present invention is to eliminate the influence of the temperature upon deformation measurements in a great many types of problems of measurements. Thus, the present invention is intended for measurement of the force which deforms a body of known material and with known dimensions, the extensometer being permanently secured to the body. As examples of such measurement may be mentioned weight test or variations of the weight of the content of a tank which is supported by legs. In this case an extensometer is fixed to each leg, the sum or average value of the indicated deformations of the legs becoming proportional to the weight of the tank on the condition that the temperature deformations of the legs are eliminated. By this measuring method the weight of tanks of any size may be determined, even if the temperature of the tank content varies and without any complicated mounting of the tank being required.

The extensometer according to the invention consists of two fixed supports which are secured to the test body the deformations of which are to be measured, and a bar located between the supports, the test body being preferably substantially plane or straight in the direction of measurement. The bar is secured to one of the supports and is connected with the other support by means of a displacement measuring device. The bar is, at least in part, surrounded by a heat-conducting but non-circulating mass such as, powder or granular material. It is of essential importance in the design of the construction that the space between the bar and the base is substantially filled with the heat-conducting substance, and that the distance between the bar and the test body is small in relation to the length of the bar. By the embodiment according to the invention it is obtained that the bar which transmits the displacement to the measuring device assumes the same temperature as the test body. If the dimension of length of the test body is changed due to a change of the temperature, the bar will practically assume the same temperature very soon, the length of the bar changing as much as the test body has done. A condition for this is, however, that the temperature coefficient of the bar—i.e. change of length per unit of temperature—is the same as that of the test body. Between that end of the bar which actuates the displacement measuring device, and the support at this end there will be no displacement. If the test body is deformed by an applied force the displacement measuring device will, on the other hand, indicate this force as a corresponding displacement.

Embodiments of the extensometer are illustrated in the accompanying drawing, in which—

FIGS. 1 and 2 are a lateral elevation, and a cross section respectively, of a fundamental embodiment, and FIGS. 3 and 4 are a lateral elevation, and a cross section respectively, of a special, technically simple embodiment.

According to FIGS. 1 and 2 the extensometer consists of two supports 1, 2 which are rigidly connected with the test body which between the supports is supposed to be substantially plane in the direction of measurement. The supports are designed as parallelepipeds and may be welded or screwed on to the base 3, or be retained by magnetic force, for example. The bar 4 is fixed in the support 1. In FIGS. 1 and 2 the bar has circular cross section, but it may as well be tubular or rectangular.

The displacement measuring device 5 is placed between the bar and the support 2. Said device 5 may consist of a mechanical transmission device, a so-called clock dial micrometer, for magnification of the displacement (the movement), an optical magnifying system with mirror and light pointer or a device for transforming the movement into a measurable electric quantity. In the last-mentioned case an inductive transformer (transmitter) of the type earlier mentioned, a capacitive transmitter consisting of one or several condensers with air gap which varies with the movement, or a resistive transmitter, consisting of so-called strain gages or carbon resistor may be used. These last-mentioned methods are often to be preferred because thereby summation of movements from several extensometers or long-range transmission of the test quantity is easily obtained.

A heat-conductive substance 6 is placed around the bar 4. This substance or mass which has a non-circulating characteristic as distinguished from a liquid may consist of metal particles in the form of a metal powder or granules which, if the surface of the test body is horizontal, only need be packed around the bar or, by admixing a suitable glue or cement-like substance, be given a gel-like consistency which adheres to the surface of the test body 3. Yet the substance 6 and the bar 4 should not be rigidly connected with one another as thereby the substance might prevent the free end of the bar from moving in relation to the test body 3. The substance 6 may also consist of a mass of solid particles in granular or powdered form which are either impregnated with a liquid or impregnated with a gel. The spaces between the solid particles can also be filled up with a liquid or gel. From the view-point of temperature compensation the distance between the test body and the bar 4 should be kept at a minimum with respect to what is constructively admitted by the displacement measuring device. Thereby the influence of the resistance to heat conduction in the substance 6 is reduced, and the temperatures of the bar 4 and the test body 3 will follow each other more accurately.

Upon deformation of the test body 3 between the supports 1 and 2 the distance apart of the supports will be changed. This change of the distance causes a displacement of the free end of the bar in relation to the support 2 which is indicated by measuring device 5. If body 3 is deformed due to change of the temperature of body 3, the supports 1 and 2 will, if the change takes place quickly, at the first moment change their relative distance, like at a mechanical deformation. However, this change of the temperature is quickly transmitted through the heat-conductive substance 6 to the bar 4 whereby the latter is deformed in the same way as body 3, and the displacement arising between the end of the bar 4 and the support 2 is eliminated.

In case of a moderately quick temperature change these transient errors become neglectable on the condition that the heat conductivity of the substance 6 is good. A condition for an elimination of the temperature changes is, besides the construction indicated above, also that body 3 and bar 4 have the same temperature coefficient. For most problems of measurement this can be solved by using the same material in bar 4 as in body 3. If this is not possible, bar 4 may be composed of several different materials with different temperature coefficients, the mutual length ratios of which are adjusted so that the bar thus divided gets a total temperature coefficient equal to that of the test body 3.

FIGS. 3 and 4 show the extensometer provided with a resistive displacement measuring device consisting of strain gages. The test body is also here assumed to be plane between the supports 8 and 9. The supports 8 and 9 consist of plates *8a* and *9a* which are screwed on or pinned to test body 7. The uprights *8b* and *9b* which form the supports, are rigidly connected with the plates. The bar 10 is secured in the upright *8b*. The other end of the bar is provided with an easily flexible reduced part 11 and secured to the measuring spring 12, said bar being passed through the hole 13 in the upright *9b*. The spring 12 is provided with a reduced part 14 on which strain gages 15 are secured. The strain gauges may then in a known manner be connected in a bridge circuit so that their resistance changes can be measured. The measuring spring 12 is rigidly connected with the upper end of the upright *9b*. A tube 16 is placed around the bar 10. That side of the tube wall which faces the test body 7, is planed so that tube 16 has a large contact surface against 7 and can, if desired, be secured to body 7 with screws or clamps. The space between bar 10 and tube 16 is filled up with heat-conductive substance 17 which is retained in its place by the elastic sealing caps 18 and 19.

Upon deformation of 7, which causes a displacement of that end of the bar 10 which is connected to the measuring spring 12, the spring 12 will, due to the easily flexible part 11, be imparted only a bending moment by which a deformation of the reduced part 14 arises. The strain gauges 15 secured on 14 will then be subjected to extension or compression and change their resistance proportionally to the size of the displacement. The large contact surface between body 7 and tube 16 results in a small resistance to heat conduction therebetween. The substance 17 also causes a small resistance to heat conduction between tube 16 and bar 10, by which bar 10 quickly follows temperature changes of body 7. With the tube 16 it is also obtained that the extensometer gets a great heat capacity and a radiation constant equivalent to that of the test body, which is essential if the test body has a large mass, in which case the extensometer must not change its temperature more quickly than the test body does due to heat radiation from the surroundings or due to air draft. The wall thickness and the diameter of the tube may in this case be adjusted with respect to the dimensions of the test body.

What I claim is:

1. In an extensometer apparatus for measuring the deformations in a test body, said extensometer including a pair of spaced reference supports secured to said test body, a bar intermediate said supports and spaced from said test body, said bar being secured at one end to one of said supports, the other end of said bar being adjacent the other of said supports and movable relative thereto, and displacement measuring means connected intermediate said other end of said bar and said other support; the improvement wherein a highly heat conductive mass of non-circulating solid particles impregnated with a liquid substantially fills the space intermediate said bar and test body.

2. In an extensometer apparatus for measuring the deformations in a test body, said extensometer including a pair of spaced reference supports secured to said test body, a bar intermediate said supports and spaced from said test body, said bar being secured at one end to one of said supports, the other end of said bar being adjacent the other of said supports and movable relative thereto, and displacement measuring means connected intermediate said other end of said bar and said other support; the improvement wherein a highly heat conductive mass of non-circulating solid particles impregnated with a gel substantially fills the space intermediate said bar and test body.

3. In an extensometer apparatus for measuring the deformations in a test body, said extensometer including a pair of spaced reference supports secured to said test body, a bar intermediate said supports and spaced from said test body, said bar being secured at one end to one of said supports, the other end of said bar being adjacent the other of said supports and movable relative thereto, and displacement measuring means connected intermediate said other end of said bar and said other support; the improvement wherein a highly heat conductive mass of non-circulating solid particles together with a liquid filling the spaces between said solid particles substantially fills the space intermediate said bar and test body.

4. In an extensometer apparatus for measuring the deformations in a test body, said extensometer including a pair of spaced reference supports secured to said test body, a bar intermediate said supports and spaced from said test body, said bar being secured at one end to one of said supports, the other end of said bar being adjacent the other of said supports and movable relative thereto, and displacement measuring means connected intermediate said other end of said bar and said other support; the improvement wherein a highly heat conductive mass of non-circulating solid particles together with a gel filling the spaces between said solid particles substantially fills the space intermediate said bar and test body.

5. In an extensometer apparatus for measuring the deformations in a test body, said extensometer including a pair of spaced reference supports secured to said test body, a bar intermediate said supports and spaced from said test body, said bar being secured at one end to one of said supports, the other end of said bar being adjacent the other of said supports and movable relative thereto, and displacement measuring means connected intermediate said other end of said bar and said other support; the improvement wherein a highly heat conductive mass of non-circulating metal particles substantially fills the space intermediate said bar and test body.

References Cited in the file of this patent

UNITED STATES PATENTS

| | | |
|---|---|---|
| 2,152,556 | Messinger | Mar. 28, 1939 |
| 2,180,176 | Stone | Nov. 14, 1939 |
| 2,632,149 | Baker | Mar. 17, 1953 |
| 2,772,569 | Ruge | Dec. 4, 1956 |
| 2,961,872 | Metzmeier et al. | Nov. 29, 1960 |